US008255914B1

(12) United States Patent
Joyce et al.

(10) Patent No.: US 8,255,914 B1
(45) Date of Patent: Aug. 28, 2012

(54) INFORMATION RETRIEVAL TECHNIQUES INVOLVING THE USE OF PRIORITIZED OBJECT REQUESTS

(75) Inventors: Scott Joyce, Foxboro, MA (US); Sreenath Rajagopal, Natick, MA (US); Anirudh Takkallapally, Natick, MA (US); Vidhi Bhardwai, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 968 days.

(21) Appl. No.: 12/238,034

(22) Filed: Sep. 25, 2008

(51) Int. Cl.
*G06F 9/46* (2006.01)
(52) U.S. Cl. ........................................ 718/103; 718/102
(58) Field of Classification Search .................. 718/102, 718/103
See application file for complete search history.

(56) References Cited

U.S. PATENT DOCUMENTS

| | | | | |
|---|---|---|---|---|
| 4,760,390 | A * | 7/1988 | Maine et al. ................... | 345/473 |
| 5,542,088 | A * | 7/1996 | Jennings et al. .............. | 718/103 |
| 6,018,567 | A * | 1/2000 | Dulman ....................... | 379/32.03 |
| 6,148,324 | A * | 11/2000 | Ransom et al. ............... | 718/105 |
| 6,622,221 | B1 | 9/2003 | Zahavi | |
| 6,850,976 | B1 * | 2/2005 | Xia .............................. | 709/224 |
| 6,895,397 | B2 * | 5/2005 | Nagamura et al. ............. | 706/46 |
| 7,106,298 | B1 * | 9/2006 | Turner et al. .................. | 345/156 |
| 7,111,057 | B1 * | 9/2006 | Sherman et al. .............. | 709/223 |
| 7,265,762 | B2 * | 9/2007 | Purdy ........................... | 345/629 |
| 7,617,304 | B2 | 11/2009 | Devarakonda et al. | |
| 7,624,396 | B1 | 11/2009 | Isenberg | |
| 7,627,617 | B2 | 12/2009 | Kavuri et al. | |
| 7,657,550 | B2 | 2/2010 | Prahlad et al. | |
| 7,668,884 | B2 | 2/2010 | Prahlad et al. | |
| 7,689,583 | B2 * | 3/2010 | Bozich et al. ................. | 707/803 |
| 7,774,742 | B2 * | 8/2010 | Gupta et al. .................. | 717/101 |
| 2002/0073129 | A1 * | 6/2002 | Wang et al. ................... | 709/102 |
| 2005/0273394 | A1 * | 12/2005 | Schonhals ...................... | 705/26 |
| 2007/0174442 | A1 * | 7/2007 | Sherman et al. .............. | 709/223 |
| 2008/0155540 | A1 * | 6/2008 | Mock et al. ................... | 718/100 |

* cited by examiner

*Primary Examiner* — Aimee Li
(74) *Attorney, Agent, or Firm* — BainwoodHuang (57) ABSTRACT

A technique retrieves information from an electronic object source. The technique involves receiving a user command from a user. The user command requires data from the electronic object source. The technique further involves generating object requests in response to the user command. The object requests have (i) respective task identifiers and (ii) respective priority identifiers. The task identifiers identify tasks to be performed by the electronic object source. The priority identifiers identify priorities of the object requests. The technique further involves processing the object requests based on the priority identifiers of the object requests to obtain objects from the electronic object source, the objects including the data required by the user command, and the data resulting from the electronic object source performing the tasks identified by the task identifiers of the object requests. Such a technique is well-suited for data storage system applications, among other things.

21 Claims, 8 Drawing Sheets

INFORMATION RETRIEVAL TECHNIQUES INVOLVING THE USE OF PRIORITIZED OBJECT REQUESTS

FIELD OF THE INVENTION

Embodiments of the present invention relate to techniques for retrieving information utilizing prioritized object requests. Particular embodiments are directed to techniques for retrieving objects containing data storage system information from an electronic object source within a data storage system based on prioritized object requests.

BACKGROUND

In general, a data storage system includes an array of disk drives, and specialized processing circuitry (e.g., a set of storage processors) which accesses the disk drive array in order to carry out load and store operations on behalf of external host devices. The data storage system typically provides one or more administrative applications which enables a system administrator or technician to set up and control operation of the data storage system.

One conventional administrative application for a data storage system offers the administrator the ability to configure and manage various aspects of the data storage system using a graphical user interface (GUI). This GUI operates as an administrative front-end to particular lower level operations of the data storage system. For instance, using the GUI, the administrator is able to create and monitor the use of logical unit numbers (LUNs), volumes, and Redundant Arrays of Inexpensive Disks (RAID) groups of disks.

As an example, the administrator may click on a screen portion of the GUI to obtain status of the LUNs currently in use within the data storage system. In response, the GUI sends a signal to lower-level software (e.g., a software stack residing on the operating system on the disk drive array) to obtain information regarding the LUNs including the total number of LUNs, the names and properties (e.g., capacity, available space, etc.) of the LUNs, and the status (e.g., ready, faulted, offline, etc.) of each LUN. Once all of this information is obtained from the lower-level software, the GUI displays this information to the administrator. At this point, the administrator may click on another screen portion of the GUI to obtain information regarding another aspect of the data storage system (e.g., status of the storage processors, etc.).

SUMMARY

Unfortunately, there are deficiencies to the above-described conventional data storage system. In particular, when the GUI sends the signal to obtain information from the lower-level software of the conventional data storage system (e.g., information regarding the LUNs), the GUI requires the administrator to wait until the GUI receives back all of the information before allowing the administrator to click on a different screen portion of the GUI to obtain information regarding another aspect of the data storage system. In certain situations where the amount of information from the low-level software may be sizeable, the administrator may need to wait an excessive amount of time (e.g., more than 30 seconds) before the GUI enables the administrator to do other work using the GUI. Such a long response time may be perceived as extremely burdensome and even unsatisfactory to the administrator.

In contrast to the above-described conventional data storage system having the GUI which waits until all of the information is returned before enabling the administrator to perform another operation, an improved information retrieval technique involves the use of prioritized object requests to carry out user commands. For example, to carry out a particular user command, an application may generate a series of object requests corresponding to a series of tasks. The application assigns priorities to the object requests and then processes the object requests (e.g., by issuing network calls to a back-end assembly) so that high priority tasks are performed ahead of less important tasks. Accordingly, the application is able to deliver a satisfying response to the user as soon as the application receives information back from the high priority tasks without being forced to wait for the less important tasks to complete.

For example, in response to an initial command from a user, it may be acceptable to deliver only critical (or basic) information to the user before allowing the user start a new command. Here, the user may feel completely satisfied upon receipt of this critical information and have no need to receive any further details. For such situations, high priority may be given to object requests associated with the critical information necessary for a satisfying user response. Moderate priority may be given to object requests associated with non-critical instructions but where it is nevertheless important not to lose such information. Low priority may be given to object requests associated with non-critical instructions that simply return detailed information (e.g., state information) which may or may not be of any interested to the user.

One embodiment is directed to a method of retrieving information from an electronic object source (e.g., a back-end assembly of a data storage system). The method includes receiving a user command from a user. The user command requires data from the electronic object source. The method further includes generating object requests in response to the user command. The object requests have (i) respective task identifiers and (ii) respective priority identifiers. The task identifiers identify tasks to be performed by the electronic object source. The priority identifiers identify priorities of the object requests. The method further includes processing the object requests based on the priority identifiers of the object requests to obtain objects from the electronic object source (e.g., issuing network calls to the back-end assembly to retrieve objects), the objects including the data required by the user command, and the data resulting from the electronic object source performing the tasks identified by the task identifiers of the object requests. Such a method is well-suited for user-interface applications which attempt to minimize latency, among other things.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved information retrieval technique involves the use of prioritized object requests to carry out commands from a user. For example, to carry out a particular user command, an application may generate a set of object requests corresponding to a set of tasks. The application assigns priorities to the object requests and then processes the object requests so that higher priority tasks are performed ahead of lower priority tasks. As a result, the application is able to deliver a satisfying response to the user as soon as the application receives information back from the higher priority tasks without being forced to wait for the less important tasks to complete.

Figure 1:
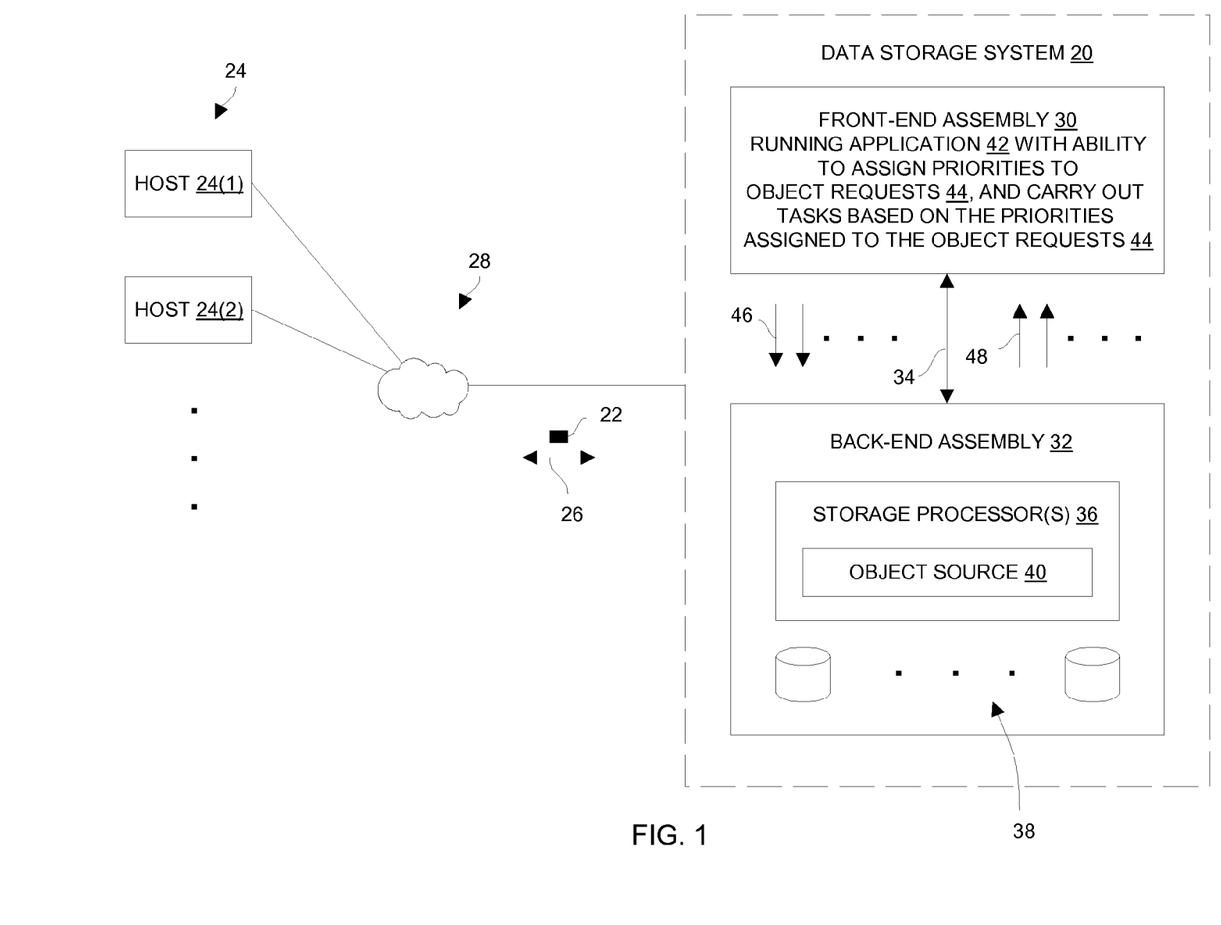
FIG. 1 is a block diagram of a data storage system which is equipped to carry out an improved information retrieval technique involving the use of prioritized object requests.

FIG. 1 is a block diagram of a data storage system 20 which is constructed and arranged to read and write host data 22 on behalf of a set of external hosts 24(1), 24(2), . . . (collectively, hosts 24) by carrying out load and store operations 26 (shown generally by the double-sided arrow 26). The hosts 24 are able to communicate with the data storage system 20 through a communications media 28 that supports block-based and/or file-based communications (e.g., copper wire, fiber optic, wireless, combinations thereof, the appropriate communications protocols, etc.).

As shown in FIG. 1, the data storage system 20 includes a front-end assembly 30 and a back-end assembly 32 which are coupled to each other via a communications medium 34. These components of the data storage system 20 may reside at a single location (e.g., in a computer room, on a common equipment rack, in a single enclosure, etc.) or may be distributed among multiple separated locations (e.g., over a local area network, over the Internet, over the communications media 28, etc.).

The back-end assembly 32 includes a set of storage processors 36 (i.e., one or more storage processors 36) and an array of disk drives 38. The set of storage processors 36 runs a specialized operating system which configures the set of storage processors 36 to operate as an efficient data storage engine when processing the load and store operations 26 from the hosts 24, i.e., each storage processor 36 is configured to read host data 22 from and write host data 22 to the array of disk drives 38.

Additionally, the operating system of the back-end assembly 32 operates as an object source 40 which is capable of providing object information to the front-end assembly 30. Such object information includes objects, properties, states, status, etc. regarding particular aspects of the data storage system 20 such as the names of the hosts 24 which access the of the data storage system 20, the names of the storage processors 36 (e.g., SP_A, SP_B, etc.), the names of logical unit numbers (LUNs) of the data storage system 20, and the names of Redundant Array of Inexpensive Disks (RAID) groups of the data storage system 20, among other things.

In order to access the object information from the object source 40, the front-end assembly 30 runs an application 42 which has the ability to assign priorities to object requests 44, and then to carry out tasks associated with the object requests 44 based on the priorities assigned to the object requests 44. In particular, to carry out tasks associated with each object request 44, the front-end assembly 28 issues network calls 46 to the back-end assembly 32 through the communications medium 34 (e.g., see the arrows 46 directed toward the back-end assembly 32). The back-end assembly 32 responds to the network calls 46 with object information 48 through the communications medium 34 (e.g., see the arrows 48 directed toward the front-end assembly 30). Further details will now be provided with reference to FIG. 2.

Figure 2:
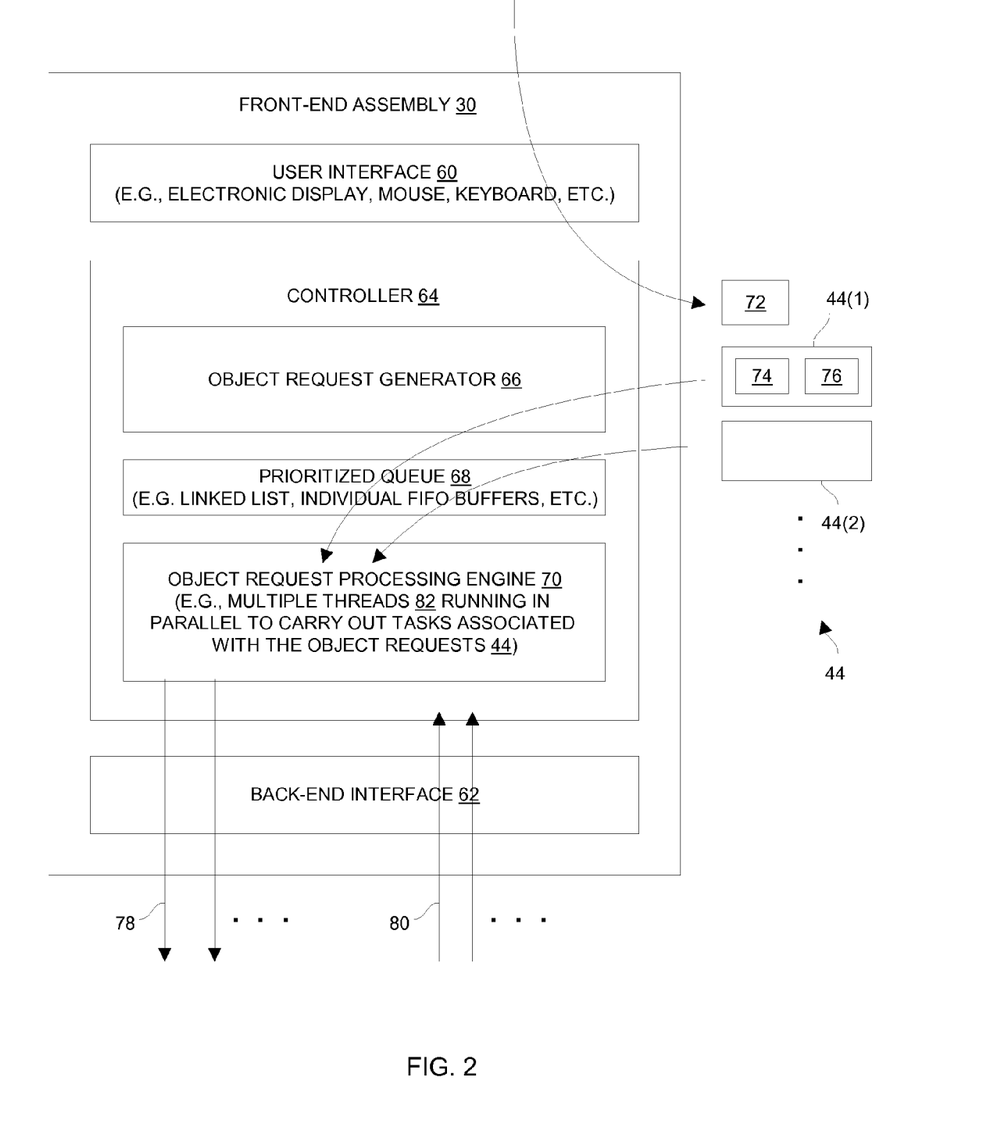
FIG. 2 is a block diagram of a front-end assembly of the data storage system of FIG. 1.

FIG. 2 provides a detailed view of certain components of the front-end assembly 30, and how these components carry out particular commands on behalf of a user. As shown, the front-end assembly 30 includes a user interface 60, a back-end interface 62, and a controller 64. The user interface 60 (e.g., an electronic display, a keyboard, a mouse, etc.) is constructed and arranged receive input from the user and provide output to the user. The back-end interface 62 is constructed and arranged to connect with the communications medium 34 and thus support communications with the back-end assembly 32 (FIG. 1). The controller 64 couples to both the user interface 60 and the back-end interface 62.

The controller 64 includes an object request generator 66, a prioritized queue 68, and an object request processing engine 70. As will be explained in further detail shortly, these components can receive a command 72 from the user and carry out a series of tasks for that command 72 on the back-end assembly 32 using prioritized object requests 44 (also see the application 42 of FIG. 1). The use of such object requests 44 enables the controller 64 to deliver a satisfying result to the user even before the series of tasks is fully completed. Moreover, once the user receives the satisfying result, the controller 64 is ready to receive a new command 72 and to start carrying out a new series of tasks for the new command 72 regardless of whether the series of tasks for the initial command 72 has fully completed.

In some arrangements, the controller 64 is implemented using a set of processors, memory and specialized software (e.g., the memory holds the prioritized queue 68, and the specialized software directs the set of processors to operate as the object request generator 66 and the object request processing engine 70). In other arrangements, the controller 64 is implemented substantially in hardware (e.g., ASICs, FPGAs, etc.). In yet other arrangements, the controller 64 is implemented using a combination of microprocessor circuitry and software, as well as specialized hardware.

During operation, the user interface 60 of the controller 64 receives commands 72 from the user through the user interface 60 (e.g., navigation and configuration commands). Such commands 72 typically require object information (or simply objects) back from the back-end assembly 32 (e.g., data regarding the various components of the data storage system 20, results of carrying out certain operations, etc.).

The object request generator 66 receives the user commands 72 through the user interface 60, and generates object requests 44(1), 44(2), . . . (collectively object requests 44) and places the object requests 44 in the prioritized queue 68 in response to the user commands 72. To this end, the object request generator 66 provides each object request 44 with a task identifier 74 and a priority identifier 76 (e.g., see the object request 44(1) in FIG. 2). The task identifiers 74 of the object requests 44 identify respective tasks 78 to be performed by the back-end assembly 32 (also see the network calls 46 in FIG. 1). The priority identifiers 76 of the object requests 44 identify respective priorities of the object requests 44.

It should be understood that a variety of memory constructs are suitable for use as the priority queue 68. In some arrangements, the prioritized queue 68 is a linked list and the object request generator 66 places the object requests 44 at locations in the linked list based on priority (e.g., highest priority object requests 44 being at one end of the linked list). In other arrangements, the prioritized queue 68 includes individual FIFO buffers (e.g., a high priority buffer, a moderate priority buffer, and a low priority buffer), and the object request generator 66 places the object requests 44 in a particular FIFO buffer based on priority. Other circuit architectures and memory constructs are suitable for forming the prioritized queue 68 as well.

The object request processing engine 70 takes the highest priority object requests 44 from the prioritized queue 68 (e.g., from the head of linked list, from a non-empty higher priority queue before a lower priority queue, etc.), and performs tasks 78 (as identified by the task identifiers 74) on the back-end assembly 32 through the back-end interface 62. In response to performing the tasks 78, the object request processing engine 70 receives task results 80 from the back-end assembly 32 through the back-end interface 62 (also see the object information 48 in FIG. 1). The task results 80 contain the information required by the user command 72 thus enabling the controller 64 to then provide that information to the user through the user interface 60.

Preferably, the object request processing engine 70 is equipped to handle multiple object requests 44 at the same time. In some arrangements, the object request processing engine 70 is formed by multiple queue-handling threads 82 (e.g., 10 threads) running in parallel. In these arrangements, each thread 82 releases (e.g., pulls or pushes) the highest prioritized object request 44 currently in the prioritized queue 68, and performs the particular task 78 identified by the task identifier of that object request 44. With multiple threads 82 running concurrently, the controller 64 is able to process multiple tasks contemporaneously. Further details will now be provided using an example which references FIGS. 3 through 7.

EXAMPLE

Figure 3:
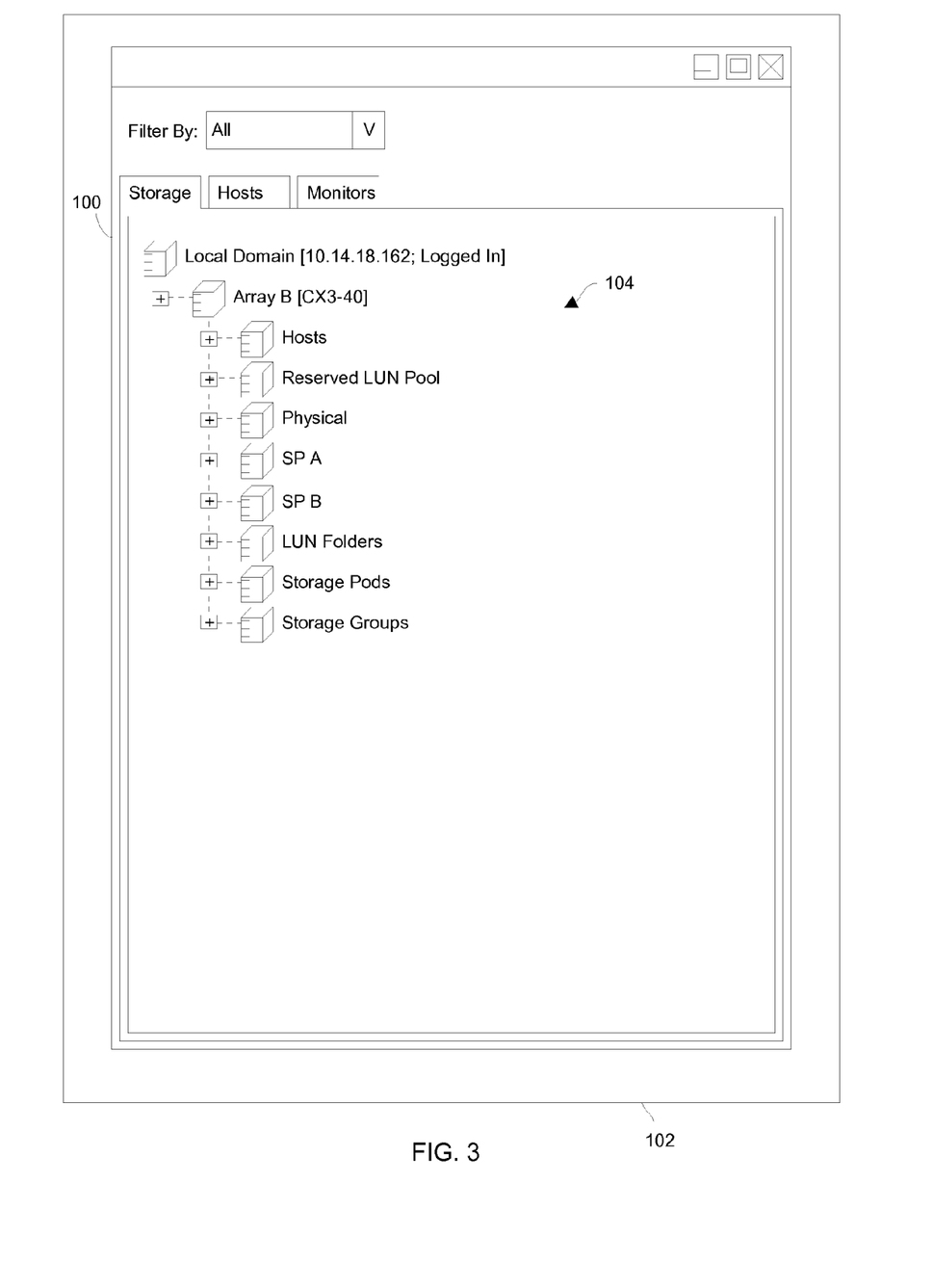
FIG. 3 is a view of an example screen portion of a GUI of the front-end assembly of FIG. 2.

FIG. 3 shows an example screen portion 100 of a graphical user interface (GUI) of the front-end assembly 30, i.e., the screen portion 100 is rendered on an electronic display 102 of the user interface 60 of the front-end assembly 30 (also FIG. 2). The screen portion 100 includes graphical images which represent various aspects regarding the data storage system 20, e.g., hosts, storage processors (SPs), LUNs, etc.

In this example, part 104 of the screen portion 100 (e.g., a particular pane or tab) displays a logical representation of a local domain containing a data storage array, i.e., "Array B". Furthermore, there are a variety of aspects associated with the array such as hosts which access the array, a reserved LUN pool, and so on.

The part 104 of the screen portion 100 is constructed and arranged to behave as a hierarchical tree which is capable of expanding and compressing in response to user navigation using the GUI. For instance, suppose that the user wishes to see a listing of the LUNs which are currently in use in the data storage system 20. To obtain such information, the user enters an appropriate command 72(1) into the user interface 60. In particular, the user may click (or perhaps double-click) on the object labeled "LUN Folders" using a mouse of the user interface 60. The controller 64 then receives a command 72 from the user interface 60 and, in response, carries out a series of tasks using prioritized object requests 44 (also see FIG. 2) in order to obtain the listing of LUNs for the user.

Figure 4:
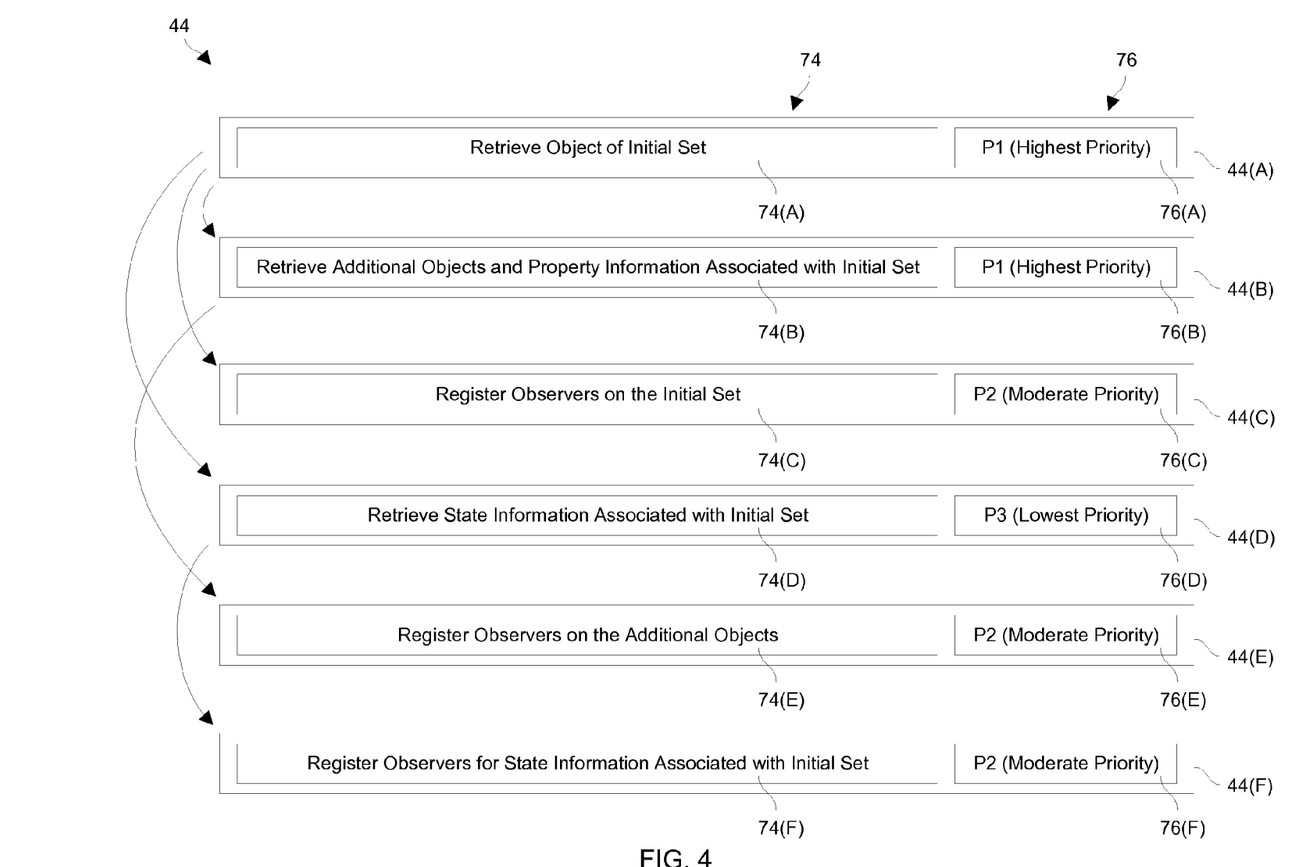
FIG. 4 is an example process flow diagram to illustrate a sequence of steps required by a user command.

FIG. 4 shows an example series of object requests 44(A), 44(B), 44(C), 44(D), 44(E), 44(F) (collectively, object requests 44) which the controller 64 generates and processes in response to a command 72 to obtain a listing of the current LUNs used in the disk drive array 38 (also see FIG. 1). As mentioned earlier, each object request 44 includes a task identifier 74 which identifies a particular task to be performed, and a priority identifier 76 which identifies a priority of that object request 44. That is, the object request 44(A) includes a task identifier 74(A) defining a first task and a priority identifier 76(A) defining a priority for that object request 44(A). Similarly, the object request 44(B) includes a task identifier 74(B) defining another task and a priority identifier 76(B) defining a priority for the object request 44(B), and so on.

In this particular example, the controller 64 does not generate the object requests 44 all at once. Rather, the controller 64 generates certain object requests 44 (e.g., the object request 44(B)) only after it receives back certain information resulting from processing an earlier object request 44 (e.g., the object request 44(A)). Such dependencies in this example are illustrated by the arrows on the left side of FIG. 4. A walkthrough of the operation of the controller 64 with respect to the series of object requests 44 in FIG. 4 (i.e., obtaining a listing of the LUNs used in the data storage system 20) will now be provided.

Figure 5:
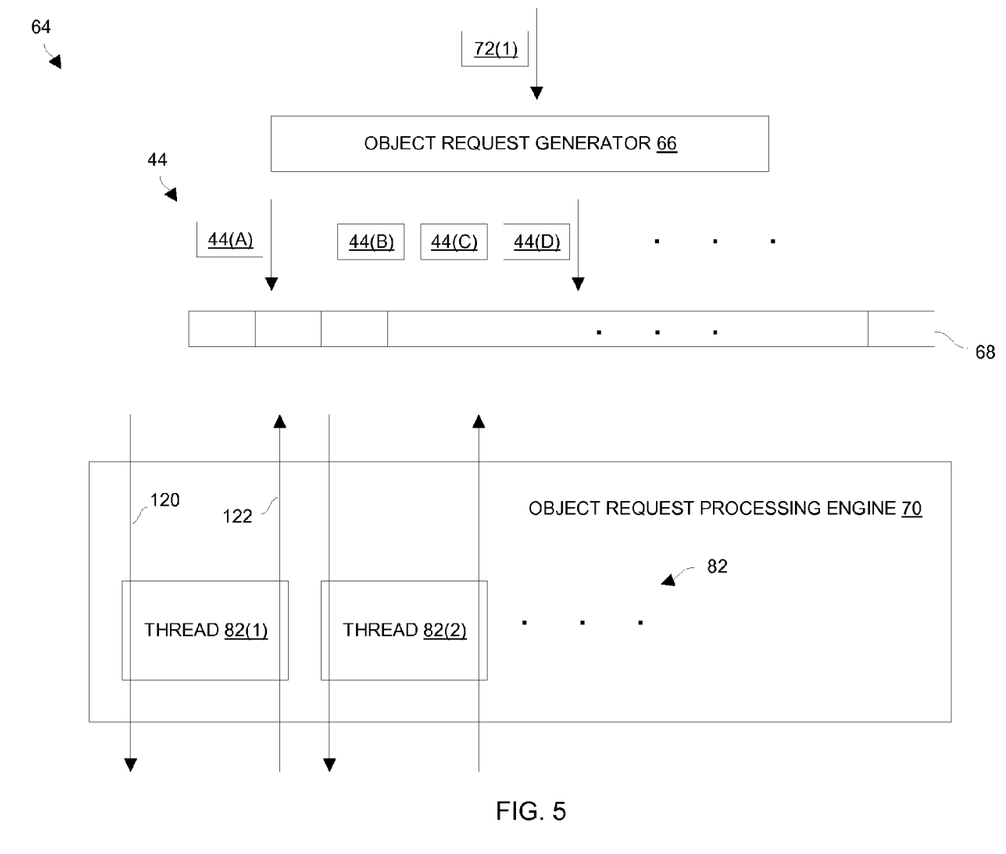
FIG. 5 is a general view of certain front-end assembly processing details when responding to the user command.

FIG. 5 shows various components of the controller 64 which are involved in generating and processing object requests 44 in order to retrieve information from the back-end assembly 32 of the data storage system 20. As shown, the object request generator 66 generates and places the object requests 44 into the prioritized queue 68. Furthermore, queue-handling threads 82(1), 82(2), . . . (collectively, threads 82) of the object request processing engine 70 release (e.g., pull) object requests 44 from the prioritized queue 68 based on priority (i.e., highest priority first) and process the object requests 44 with the back-end assembly 32.

In particular, in response to a user command 72(1) to retrieve a listing of the LUNs in use in the disk drive array 38, the object request generator 66 initially generates the object request 44(A). As shown in FIG. 4, the task identifier 74(A) of the object request 44(A) identifies instructions (i.e., a task) which direct the object source 40 of the back-end assembly 32 to return an initial set of objects to define a child node level LUN structure, i.e., a child level hierarchically beneath the "LUN Folders" object in FIG. 3. Since this child node information is critical (i.e., the information is necessary before the object request generator 66 can do anything else to respond to the user), the object request generator 66 sets the priority of the priority identifier 76(A) to "P1" (i.e., the highest priority) and then places the object request 44(A) in the prioritized queue 68.

One of the queue-handling threads 82 (e.g., thread 82(1)) of the object request processing engine 70 pulls the object request 44(A) from the prioritized queue 68, and carries out the task identified by the task identifier 74(A). In particular, the thread 82 directs the object source 40 to responds with various LUN features currently employed in the disk drive array 38. The activity of carrying out the task is illustrated by the arrow 120, and the delivery of the initial set of objects by the object source 40 to the controller 64 is illustrated by the arrow 122 in FIG. 5.

Next, the object request generator 66 generates further object requests 44(B), 44(C) and 44(D). The task identifier 74(B) is constructed and arranged to direct the object source 40 of the back-end assembly 32 to provide additional objects and property information associated with the initial set of objects provided in response to the object request 44(A). By way of example, such property data includes text strings "MetaLUNs" and "PrivateLUNs". The property data may further include other LUN type information, capacity information, etc. Since such information is deemed critical (i.e., necessary in order to provide a satisfactory response to the user in the GUI), the object request generator 66 sets the priority of the object request 44(B) to "P1" (i.e., the highest priority) and then places the object request 44(B) in the prioritized queue 68 for processing by the object request processing engine 70.

For the object request 44(C), the task identifier 74(C) identifies a task of directing the object source 40 to send updates to the controller 64 in the event the condition of any of the LUNs subsequently changes in the future, i.e., often referred to as registering observers. Such updates may include the use of a new LUN in the disk drive array 38, removal of a LUN, changing a LUN, etc. Since such information is not deemed critical to satisfying the user command 72(1), but since it is also important that the controller 64 direct the object source 40 to provide updates as soon as possible so that the controller 64 does not miss any updates, the object request generator 66 sets the priority of the object request 44(C) to "P2" (i.e., moderate so that it is less than the highest priority but not the lowest priority). The object request generator 66 then places the object request 44(C) in the prioritized queue 68.

For the object request 44(D), the task identifier 74(D) identifies a task of retrieving detailed state information associated with the initial set of objects from the object source 40. Such state information includes whether the LUNs are in ready states, offline states, faulted states, etc., and is deemed to be non-critical. Accordingly, the priority identifier 76(D) sets the priority of the object request 44(D) to "P3" (i.e., lowest priority) since the controller 64 is able to deliver a satisfying result to the user without the state information requested by the object request 44(D).

At this point, it should be understood that if the object requests 44(B), 44(C) and 44(D) concurrently reside in the prioritized queue 68, the next available thread 82 will process the object request 44(B) ahead of the other object requests 44(C) and 44(D) since the object request 44(B) has the highest priority, "P1". Such operation minimizes latency to the user by returning the additional objects and property information to the controller 64 as quickly as possible.

Similarly, if only the object requests 44(C) and 44(D) concurrently reside in the prioritized queue 68, the next available thread 82 will process the object request 44(C) ahead of the other object request 44(D) since the object request 44(C) has a higher priority (i.e., "P2") than that of the object request 44(D) (i.e., "P3").

As further shown in FIG. 4, once the controller 64 has received a response containing the additional objects and property information associated with the initial set of objects from the object source 40 (i.e., a response to object request 44(B)), the controller 64 generates the object request 44(E) and places it in the prioritized queue 68. In particular, the object request 44(E) identifies a task of registering observers for the additional objects (i.e., configuring the back-end assembly 32 to send any changes in the additional objects to the controller 64), and has a moderate priority (i.e., "P2").

Similarly, once the controller 64 has received the state information associated with the initial set of objects (i.e., a response to object request 44(D)), the controller 64 generates the object request 44(F) and places it in the prioritized queue 68. The object request 44(F) identifies the task of registering observers for the state information associated with the initial set of objects (i.e., configuring the back-end assembly 32 to send any changes in the state information to the controller 64), and has a moderate priority (i.e., "P2").

Figure 6:
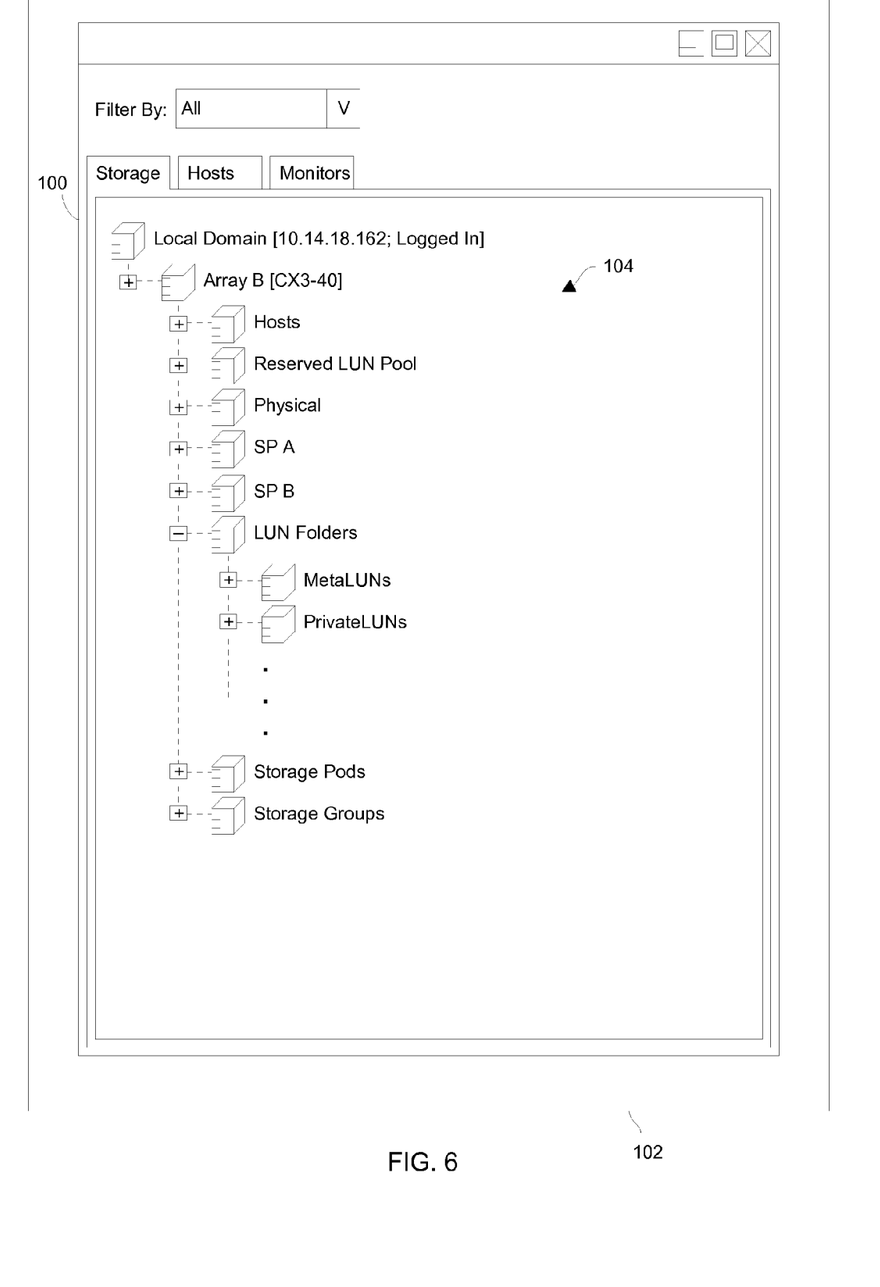
FIG. 6 is a view of the example screen portion of FIG. 3 after the screen portion has been updated to satisfy the user command but possibly before all tasks of the user command have fully completed.

FIG. 6 shows an updated view of the screen portion 100 which includes information resulting from processing the object requests 44 of the user command 72(1). In particular, the "LUN Folders" node of the screen part 104 now has been expanded to include child nodes, e.g., "MetaLUNs", "PrivateLUNs", and so on.

This updated view is provided by the controller 64 as soon as the controller 64 receives responses to the object requests 44(A) and 44(B) to minimize latency to the user. That is, once the controller 64 have received the information from the back-end assembly 32 for the object requests 44(A) and 44(B), the controller 64 has all the data it needs to provide a satisfying response to the user and thus displays this newly obtained information.

Figure 7:
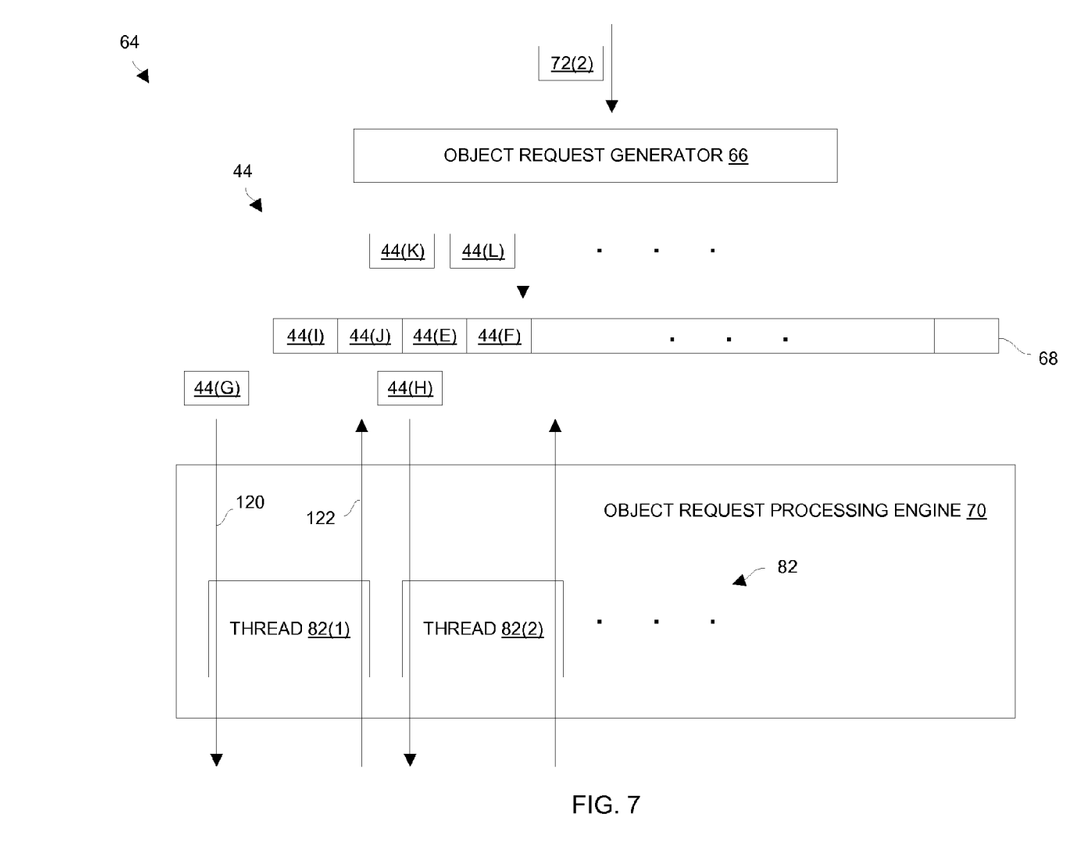
FIG. 7 is a general view of certain front-end assembly processing details when responding to another user command before all tasks of the initial user command have fully completed.

At this point, the user has been delivered a satisfying response and is able to enter a new user command 72(2) even if all of the object requests 44 generated by the initial user command 72(1) have not been fully processed (e.g., also see FIG. 7). For instance, the user is now able to enter the new command 72(2) (e.g., click on "MetaLUNs" to obtain more information regarding the MetaLUNs) while the object requests 44(C), 44(D), 44(E) and 44(F) of the initial command 72(1) still reside in the prioritized queue 68 awaiting an available thread 82 for processing, or while the object requests 44(C), 44(D), 44(E) and 44(F) are in various states of processing but not fully completed.

Moreover, there is no requirement that the new user command 72(2) be related to the initial user command 72(1). Rather, the new user command 72(2) may be completely unrelated to the initial user command 72(1) (e.g., the user may click on "SPA" to obtain information about storage processor "A"). Nevertheless, the controller 64 starts processing the new command 72(2) even if the object requests 44(C), 44(D), 44(E) and 44(F) of the initial command 72(1) have not be completed.

FIG. 7 illustrates a situation in which the controller 64 receives the new command 72(2) and starts processing the new command 72(2) before all of the object requests 44 of the initial command 72(1) are completed. In particular, the object request generator 66 generates new object requests 44(G), 44(H), 44(I), 44(J), 44(K) and 44(L) in response to a new command 72(2) while the object requests 44(E) and 44(F) still reside in the prioritized queue 68. The object request processing engine 70 processes the object requests 44(G) and 44(H) ahead of the object requests 44(E) and 44(F) since the object requests 44(G) and 44(H) have higher priorities. Similarly, the object requests 44(I) and 44(J) sit ahead of the object requests 44(E) and 44(F) for processing ahead of the object requests 44(E) and 44(F) because the object requests 44(I) and 44(J) have higher priorities.

The size of the prioritized queue 68 and the number of queue-handling threads 82 are preferably large enough for the particular application so that all of the object requests 44 are reliably pulled and processed. Accordingly, none of the object requests 44 will be starved out.

In some arrangements, the controller 64 delays release of the lower priority object requests 44 from the prioritized queue 68 until all of the higher priority object requests have been released from the prioritized queue 68. For instance, the threads 82 of the object request processing engine 70 may wait until all of the object requests 44 having a priority of "P1" have completed before pulling object requests 44 having a priority of "P2" from the prioritized queue 68. Similarly, the threads 82 of the object request processing engine 70 may wait until all of the object requests 44 having a priority of "P2" have completed before pulling object requests 44 having a priority of "P3" from the prioritized queue 68.

Of course, the particular object request tasks and priorities, as well as the particular dependencies between object requests 44 depend on the particular application and operation performed by that application. In the example above, the application retrieves information about the data storage system 20 for rendering in a graphical image that behaves as an expandable/compressible hierarchical tree among other things. Moreover, the particular number of object requests 44 is capable of varying based on the particular application, i.e., based on factors such as the number nodes to be shown in the view, the complexity of the user command, whether there is critical information and/or non-critical information required, etc. A summary of certain operations will now be provided with reference to FIG. 8.

CONCLUSION

Figure 8:
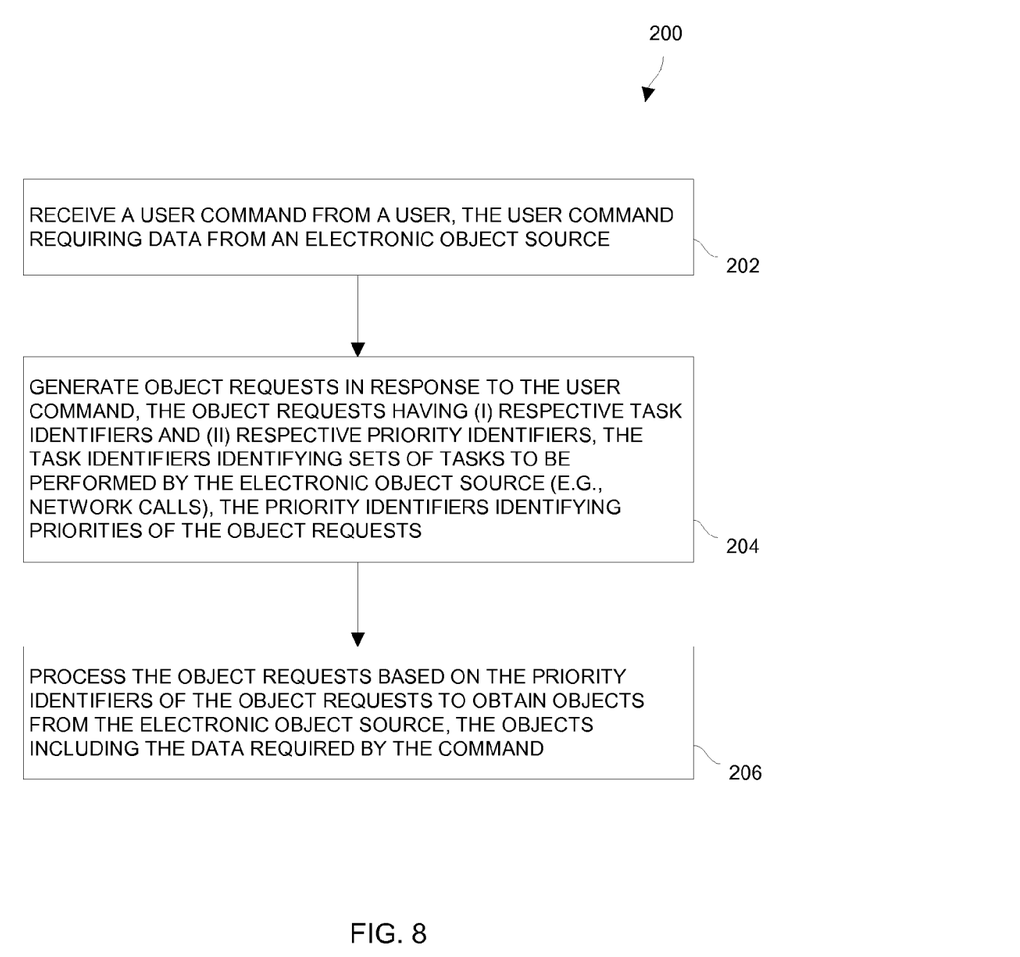
FIG. 8 is a flowchart of a procedure which is performed by the front-end assembly of FIG. 2.

FIG. 8 is a flowchart of a procedure 200 which is performed by the controller 64 when processing commands 72 from the user interface 60. In step 202, the controller 64 receives a user command 72 from the user. The user command 72 requires data from an electronic object source 40 (also see FIG. 2).

In step 204, the controller 64 generates object requests 44 in response to the user command 72. The object requests 44 have respective task identifiers 74 and respective priority identifiers 76 (also see FIG. 4). The task identifiers 74 identify tasks (e.g., network calls) to be performed using the electronic object source 40. The priority identifiers 76 identifying priorities of the object requests 44.

In step 206, the controller 64 processes the object requests 44 based on the priority identifiers 76 of the object requests 44 to obtain objects (also see the responses 80 in FIG. 2) from the electronic object source 40. The objects include the data required by the user command 72. Such priority-based processing of the object requests 44 enables critical tasks to be performed ahead of non-critical tasks. Accordingly, the controller 64 is able to start processing a new command 72 from the user once the critical tasks have finished, but even though some or all of the non-critical tasks have not completed. Such operation minimizes user latency but nevertheless provides the user with satisfying user responses, e.g., gratifying GUI behavior.

As mentioned above, an improved information retrieval technique involves the use of prioritized object requests 44 to carry out commands 72 from a user. For example, to carry out a particular user command 72, an application 42 may generate a set of object requests 44 corresponding to a set of tasks. The application 42 assigns priorities to the object requests 44 and then processes the object requests 44 so that higher priority tasks are performed ahead of lower priority tasks. As a result, the application 72 is able to deliver a satisfying response to the user as soon as the application 72 receives information back from the high priority tasks without being forced to wait for the less important tasks to complete.

While various embodiments of the invention have been particularly shown and described, it will be understood by those skilled in the art that various changes in form and details may be made therein without departing from the spirit and scope of the invention as defined by the appended claims.

For example, some aspects were described above in the context of a data storage system 20. Along these lines, these aspects are particularly well-suited for applications involved in presenting, as nodes of an expandable hierarchical tree, representations relating to operation of the data storage system 20. In particular, such representations may include (i) names of external hosts which access the of the data storage system, (ii) names of storage processors of the data storage system, (iii) names of logical unit numbers (LUNs) of the data storage system, and (iv) names of Redundant Array of Inexpensive Disks (RAID) groups of the data storage system, among other things.

Nevertheless, various aspects of the invention are well-suited for environments other than data storage systems. Such environments include object request applications where it is important to deliver low latency responses (e.g., user interface applications), among others.

Additionally, it should be understood that the GUI of the front-end assembly 30 was described above as being constructed and arranged to behave as an expandable hierarchical tree by way of example only. Other types of behavior are suitable for use by the GUI as well. For example, in some arrangements, the GUI is constructed and arranged so that when the user opens a dialog box, there is a link in that dialog box to another dialog box. Such "dialog tree" behavior as well as other similar types of behavior are intended to belong to GUIs of various embodiments of the invention.

What is claimed is:

1. A method of retrieving information from an electronic object source, the method comprising:
   receiving a user command from a user, the user command requiring data from the electronic object source;
   generating object requests in response to the user command, the object requests having (i) respective task identifiers and (ii) respective priority identifiers, the task identifiers identifying tasks to be performed using the electronic object source, the priority identifiers identifying priorities of the object requests; and
   processing the object requests based on the priority identifiers of the object requests to obtain objects from the electronic object source, the objects including the data required by the user command, and the data resulting from the electronic object source performing tasks identified by the task identifiers of the object requests,
   wherein processing the object requests based on the priority identifiers of the object requests includes:
      placing the object requests into a prioritized queue;
      releasing the object requests from the prioritized queue to the electronic object source based on the priority identifiers of the object requests; and
      returning control to the user after releasing fewer than all of the object requests.

2. A method as in claim 1 wherein receiving the user command from the user includes:
   acquiring the user command from a graphical user interface (GUI) operated by the user.

3. A method as in claim 2, further comprising:
   displaying at least some of the data in a GUI screen portion rendered on an electronic display.

4. A method as in claim 3 wherein displaying includes:
providing a graphical image in the GUI screen portion, the graphical image behaving as an expandable hierarchical tree in response to user navigation using the GUI.

5. A method as in claim 4 wherein releasing the object requests from the prioritized queue to the electronic object source based on the priority identifiers of the object requests includes:
running queue-handling threads, each queue-handling thread being constructed and arranged to (i) read an object request having a priority identifier identifying a priority which is highest among those currently in the prioritized queue, and (ii) effectuate performance, by the electronic object source, of a particular set of tasks identified by a particular task identifier of that object request.

6. A method as in claim 5, further comprising:
placing additional object requests into the prioritized queue, the additional object requests being generated in response to another user command acquired from the GUI; and
while releasing the object requests from the prioritized queue, contemporaneously releasing the additional object requests from the prioritized queue in a prioritized manner.

7. A method as in claim 6 wherein contemporaneously releasing the additional object requests includes:
before releasing all of the object requests generated in response to the user command from the prioritized queue, releasing at least one of the additional object requests generated in response to the other user command from the prioritized queue.

8. A method as in claim 4 wherein placing the object requests into the prioritized queue includes:
placing higher priority object requests and lower priority object requests into the prioritized queue, each higher priority object request having a high priority identifier, each lower priority object request having a low priority identifier, the high priority identifier identifying a priority which is higher than that of the low priority identifier; and
wherein releasing the object requests from the prioritized queue based on the priority identifiers of the object requests includes:
delaying release of the lower priority object requests from the prioritized queue until all of the higher priority object requests have been released from the prioritized queue, and then releasing the lower priority object requests from the prioritized queue once all of the higher priority object requests have been released from the prioritized queue.

9. A method as in claim 4 wherein the electronic object source is a data storage assembly; and wherein generating the object requests in response to the user command includes:
providing a first object request having (i) a first task identifier which requests, from the data storage assembly, logical unit number (LUN) structure data relative to a node on the graphical image behaving as the expandable hierarchical tree and (ii) a first priority identifier, and
providing a second object request having (i) a second task identifier which requests, from the data storage assembly, updates to the LUN structure data and (ii) a second priority identifier, the first priority identifier identifying a priority which is higher than that of the second priority identifier of the second object request.

10. A method as in claim 9 wherein generating the object requests in response to the user command further includes:
providing a third object request having (i) a third task identifier which requests, from the data storage assembly, LUN property data associated with the LUN structure data and (ii) a third priority identifier identifying a priority which is higher than that of the second priority identifier and which is equal to that of the first priority identifier.

11. A method as in claim 10 wherein generating the object requests in response to the user command further includes:
providing a fourth object request having (i) a fourth task identifier which requests, from the data storage assembly, LUN state data associated with the LUN structure data and (ii) a fourth priority identifier identifying a priority which is lower than that of the second priority identifier.

12. A method as in claim 4 wherein the electronic display forms a portion of a front-end component of a data storage system; wherein the electronic object source forms a portion of a back-end component of the data storage system; and wherein providing the graphical image in the GUI screen portion includes:
presenting, as nodes of an expandable hierarchical tree, representations relating to operation of the data storage system, the representations including (i) names of external hosts which access the data storage system, (ii) names of storage processors of the data storage system, (iii) names of logical unit numbers (LUNs) of the data storage system, and (iv) names of Redundant Array of Inexpensive Disks (RAID) groups of the data storage system.

13. The method as recited in claim 1, wherein the user command is a first user command and the method further comprises:
receiving a second user command from the user, the second user command requiring data from the electronic object source;
generating object requests in response to the second user command; and
processing the object requests from the first user command and the second user command in order of priority, with higher priority object requests from the second user command being processed before lower priority object requests from the first user command.

14. The method as recited in claim 13, further comprising returning partially complete data from the electronic object source to the user as object requests for respective user commands are processed, including:
returning data from the electronic object source to the user in response to the first user command before all of the object requests associated with the first user command have been completed;
returning data from the electronic object source to the user in response to the second user command before all of the object requests associated with the second user command have been completed; and
returning data from the electronic object source to the user in response to the second user command before all of the object requests associated with the first user command have been completed.

15. The method as recited in claim 14,
wherein the first user command and the second user command are received by a single user application having a graphical user interface (GUI), the GUI presenting different objects of a data storage system as different icons, wherein the first user command is initiated by the user clicking one of the icons of the GUI and the second user command is initiated by the user clicking another of the icons of the GUI, wherein data resulting from the electronic object source performing the tasks identified by the task identifiers of the object requests are displayed on the GUI, including partially complete data; and wherein the GUI is operable by the user to click multiple icons to initiate multiple user commands, in succession, without requiring that processing for earlier-initiated commands be completed before processing for later-initiated commands is begun.

16. A front-end assembly, comprising:

a user interface constructed and arranged to interface with a user;

a back-end interface constructed and arranged to interface with a back-end assembly; and a controller coupled to the user interface and the back-end interface, the controller being constructed and arranged to:

receive a user command from the user through the user interface, the user command requiring data from the back-end assembly, generate object requests in response to the user command, the object requests having (i) respective task identifiers and (ii) respective priority identifiers, the task identifiers identifying tasks to be performed by the back-end assembly, the priority identifiers identifying priorities of the object requests, and process the object requests based on the priority identifiers of the object requests to obtain objects from the back-end assembly through the back-end interface, the objects including the data required by the user command, and the data resulting from the back-end assembly performing tasks identified by the task identifiers of the object requests, wherein, the controller, when processing the object requests based on the priority identifiers of the object requests, is further constructed and arranged to:

place the object requests into a prioritized queue;

release the object requests from the prioritized queue to the electronic object source based on the priority identifiers of the object requests; and return control to the user after releasing fewer than all of the object requests.

17. A front-end assembly as in claim 16 wherein the user interface includes a user input device and an electronic display;

wherein the controller, when receiving the user command from the user, is constructed and arranged to acquire the user command from the user through the user input device and provide a graphical user interface (GUI) output to the user through the electronic display.

18. A front-end assembly as in claim 17 wherein the controller, when providing the GUI output to the user, is constructed and arranged to:

provide, on the electronic display, a graphical image which behaves as an expandable hierarchical tree in response to user navigation using the user input device.

19. A front-end assembly as in claim 18 wherein the controller, when releasing the object requests from the prioritized queue based on the priority identifiers of the object requests, is constructed and arranged to:

run queue-handling threads, each queue-handling thread being constructed and arranged to (i) read an object request having a priority identifier identifying a priority which is highest among those currently in the prioritized queue, and (ii) effectuate performance, by the back-end assembly, of a particular set of tasks identified by a particular task identifier of that object request.

20. A front-end assembly as in claim 18 wherein the controller, when placing the object requests into the prioritized queue, is constructed and arranged to:

place higher priority object requests and lower priority object requests into the prioritized queue, each higher priority object request having a high priority identifier, each lower priority object request having a low priority identifier, the high priority identifier identifying a priority which is higher than that of the low priority identifier; and wherein the controller, when releasing the object requests from the prioritized queue based on the priority identifiers of the object requests, is constructed and arranged to:

delay release of the lower priority object requests from the prioritized queue until all of the higher priority object requests have been released from the prioritized queue, and then release the lower priority object requests from the prioritized queue once all of the higher priority object requests have been released from the prioritized queue.

21. A front-end assembly as in claim 18 wherein the front-end assembly and the back-end assembly form components of a data storage system; and wherein the controller, when providing the graphical image on the electronic display, is constructed and arranged to:

present, as nodes of an expandable hierarchical tree, representations relating to operation of the data storage system, the representations including (i) names of external hosts which access the data storage system, (ii) names of storage processors of the data storage system, (iii) names of logical unit numbers (LUNs) of the data storage system, and (iv) names of Redundant Array of Inexpensive Disks (RAID) groups of the data storage system, in response to processing the object requests through the prioritized queue.

* * * * *